US010405328B2

(12) United States Patent
Corroy et al.

(10) Patent No.: US 10,405,328 B2
(45) Date of Patent: Sep. 3, 2019

(54) PREDICTING RESOURCE SCHEDULING (71) Applicant: Telefonaktiebolaget LM Ericsson (publ), Stockholm (SE)

(72) Inventors: Steven Corroy, Stockholm (SE); Jing Fu, Solna (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 355 days.

(21) Appl. No.: 15/316,073

(22) PCT Filed: Jul. 1, 2014

(86) PCT No.: PCT/SE2014/050828
§ 371 (c)(1),
(2) Date: Dec. 2, 2016

(87) PCT Pub. No.: WO2016/003334
PCT Pub. Date: Jan. 7, 2016

(65) Prior Publication Data
US 2017/0111916 A1    Apr. 20, 2017

(51) Int. Cl.
*H04W 72/12* (2009.01)
*H04W 72/04* (2009.01)
*H04L 27/26* (2006.01)
*H04W 72/08* (2009.01)
*H04W 72/10* (2009.01)

(52) U.S. Cl.
CPC ......... *H04W 72/12* (2013.01); *H04L 27/2601* (2013.01); *H04W 72/0426* (2013.01); *H04W 72/0433* (2013.01); *H04W 72/082* (2013.01); *H04W 72/10* (2013.01)

(58) Field of Classification Search
None
See application file for complete search history.

(56) References Cited

U.S. PATENT DOCUMENTS

| | | | |
|---|---|---|---|
| 2012/0214498 A1 | 8/2012 | Joko | |
| 2014/0024388 A1* | 1/2014 | Earnshaw | H04W 72/02 455/452.2 |

FOREIGN PATENT DOCUMENTS

WO    2013177774 A1    12/2013

* cited by examiner

*Primary Examiner* — Alex Skripnikov
(74) *Attorney, Agent, or Firm* — Sage Patent Group (57) ABSTRACT

The invention relates to methods and nodes for scheduling resource blocks in a wireless communications network. The invention further relates to computer programs performing the methods according to the invention, and computer program products comprising computer readable medium having the computer programs embodied therein. In a first aspect of the invention, a method of a Radio Resource Management (RRM) node (11) in a first cell (12) is provided for facilitating scheduling of resource blocks for at least one mobile terminal (UE4, UE5, UE6) in a neighboring second cell (15) of a wireless communications network (10). The method comprises predicting allocation of one or more resource blocks in a subsequent scheduling time interval to at least one mobile terminal (UE1, UE2, UE3) in the first cell, and sending information pertaining to the predicted allocation to an RRM node (14) of the neighboring second cell.

31 Claims, 9 Drawing Sheets

|   | TTIs | | | | | | | |
|---|---|---|---|---|---|---|---|---|
| | 1 | 0 | 0 | 0 | 0 | 0 | 0 | 0 |
| | 3 | 3 | 3 | 3 | 3 | 0 | 0 | 0 |
| | 0 | 1 | 1 | 1 | 1 | 0 | 0 | 0 |
| | 4 | 1 | 1 | 1 | 1 | 1 | 1 | 4 |
| | 4 | 1 | 1 | 1 | 1 | 1 | 1 | 4 |
| | 4 | 1 | 1 | 1 | 1 | 1 | 1 | 4 |
| | 4 | 1 | 1 | 1 | 1 | 0 | 0 | 4 |
| | 0 | 1 | 1 | 1 | 1 | 0 | 0 | 4 |
| | 0 | 1 | 1 | 1 | 1 | 0 | 0 | 0 |
| | 0 | 0 | 0 | 0 | 0 | 0 | 2 | 2 |
| | 0 | 0 | 0 | 0 | 0 | 0 | 2 | 2 |

OFDM resource blocks

| 0 | Unused block |
|---|---|
| 1 | Low priority |
| 2 | Resource block with temporary good SINR |
| 3 | Resource blocks with good geometry statistics |
| 4 | Highest priority for VoLTE traffic |

PREDICTING RESOURCE SCHEDULING

TECHNICAL FIELD

The invention relates to methods and nodes for scheduling resource blocks in a wireless communications network. The invention further relates to computer programs performing the methods according to the invention, and computer program products comprising computer readable medium having the computer programs embodied therein.

BACKGROUND

In Long-Term Evolution (LTE) communications networks, orthogonal frequency-division multiplexing (OFDM) modulation is employed, and a network element known as a scheduler dynamically assigns OFDM resource blocks to User Equipments (UEs) for uplink or downlink transmission. These resource blocks assignments consists of both time and frequency assignments.

Figure 1:
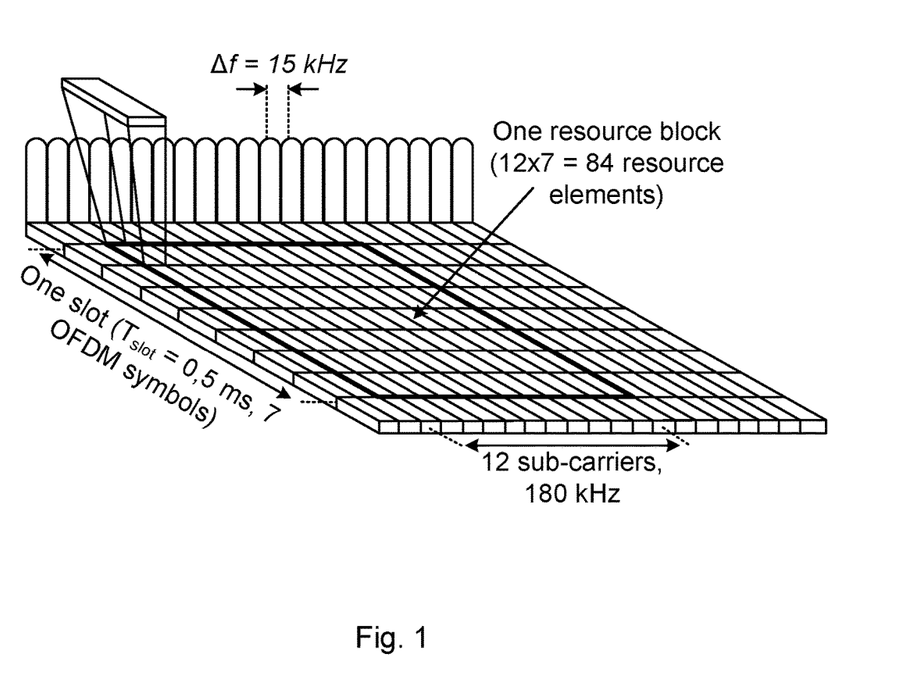
FIG. 1 illustrates structure of OFDM resource blocks in LTE.

With reference to FIG. 1, the smallest physical resource in LTE is called a resource element and consists of one OFDM subcarrier over the duration of one OFDM symbol. A resource block consists of 12 OFDM subcarriers over a 0.5 ms slot. The allocation of resource block is defined over Transmission Time Intervals (TTIs) of 1 ms and therefore the minimum scheduling unit is called a resource block pair which consists of 2 resource blocks. Any number of resource blocks, from 6 to 110, can be allocated to a UE. This represents a bandwidth between 1 and 20 MHz.

Typically the scheduling is performed at each TTI. To provide an optimal resource allocation, a scheduler should take into account the difference in quality among resource blocks. Indeed, each UE will have a different channel gain on different resource blocks and a resource block might be more valuable for some UEs than others.

A scheduler could aim at optimizing a single parameter, or a number of parameters, depending on the goals of an operator of the communications network. One possibility is to maximize a specific metric with respect to some constraints. For example, the scheduler may try to maximize a sum rate with some power constraint using a water-filling algorithm. In practice, the most common scheduler algorithms are:

Round-Robin Scheduler: this scheduler algorithm distributes the same number of resource blocks to all users. It is simple but it can lead to highly unfair resource allocation, where users at a cell edge are allocated the same number of resources as users located centrally in the cell, resulting in a great difference in terms of throughput.

Proportional fair scheduler: this scheduler addresses the main weakness of the Round-Robin scheduler, i.e., the fairness issue. This scheduler allocates resources to users according to priority mechanism. The priority of a user is inversely proportional to the amount of data the user could transmit in previous communication phases. That way the scheduler algorithm makes sure that all users are treated fairly in terms of throughput rather than allocated resources.

Such a channel dependent scheduling is typically done in the downlink because it is relatively simple for a UE to measure its downlink quality. In the uplink, however, it requires the UE to transmit a sounding reference signal (SRS) to an LTE radio access node, the eNodeB with which the UE is associated. Based on the received SRS, the eNodeB will estimate the uplink quality for the UE. This method can be costly in terms of resource overhead. The frequency of the SRSs can be varied from 2 ms (for very precise quality estimation) to about 160 ms (for less precise estimation but smaller overhead).

Inter-Cell Interference Coordination (ICIC) schemes are known which apply restrictions to the radio resource management (RRM) block of the eNodeB, thus improving channel conditions across subsets of users that are severely impacted by the interference, thereby improving or attaining high spectral efficiency. This coordinated resource management can be achieved through fixed, adaptive or real-time coordination with the help of additional inter-cell signalling in which the signalling rate can vary accordingly. In general, inter-cell signalling refers to the signalling across the communication interface between neighboring cells and the received measurement message reports from UEs. In LTE networks, this interface is referred to as the X2 interface.

A problem of many current real-time ICIC schemes is that they are assuming that bases stations can communicate across the X2 inter-cell interface without significant delays. In this scenario, current and upcoming scheduling decisions from one base station/cell can be sent to neighboring cells and adaptive schemas can be used to minimize the interference.

However, current X2 interfaces between bases stations are very slow with a delay in the order of approximately 50 ms, and is only decreasing very slowly. Since this delay is much larger than the duration of a TTI, and scheduling is performed on a per-TTI basis, once current and coming scheduling decisions reach the neighboring cells, the scheduling decisions are already outdated.

SUMMARY

An object of the present invention is to solve, or at least mitigate, this problem in the art and thus to improve the scheduling of resources in a communications network.

This object is attained in a first aspect of the invention by a method of an RRM node in a first cell of facilitating scheduling of resource blocks for at least one mobile terminal in a neighbouring second cell of a wireless communications network. The method comprises predicting allocation of one or more resource blocks in a subsequent scheduling time interval to at least one mobile terminal in the first cell, and sending information pertaining to the predicted allocation to an RRM node of the neighbouring second cell.

This object is attained in a second aspect of the present invention by a method of an RRM node of scheduling resources for at least one mobile terminal in a second cell of a wireless communications network (10). The method comprises receiving, from an RRM node of a neighbouring first cell, information pertaining to predicted allocation of one or more resource blocks in a subsequent scheduling time interval to at least one mobile terminal in the neighbouring first cell, and allocating one or more resource blocks in the subsequent scheduling time interval to the at least one mobile terminal of the second cell at least in part based on the received information.

This object is attained in a third aspect of the present invention by an RRM node in a first cell configured to facilitate scheduling of resource blocks for at least one mobile terminal in a neighbouring second cell of a wireless communications network, the RRM node comprising a processing unit and a memory, which memory contains instructions executable by the processing unit, whereby the RRM node is operative to predict allocation of one or more resource blocks in a subsequent scheduling time interval to at least one mobile terminal in the first cell, and to send information pertaining to the predicted allocation to an RRM node of the neighbouring second cell.

This object is attained in a fourth aspect of the present invention by an RRM node configured to schedule resources for at least one mobile terminal in a second cell of a wireless communications network, the RRM node comprising a processing unit and a memory, which memory containing instructions executable by the processing unit, whereby the RRM node is operative to receive, from an RRM node of a neighbouring first cell, information pertaining to predicted allocation of one or more resource blocks in a subsequent scheduling time interval to at least one mobile terminal in the neighbouring first cell, and to allocate one or more resource blocks in the subsequent scheduling time interval to the at least one mobile terminal of the second cell at least in part based on the received information.

Further provided are computer programs performing the methods according to the invention, and computer program products comprising computer readable medium having the computer programs embodied therein.

Advantageously, in embodiments of the present invention, an RRM node such as a Radio Base Station (RBS), a Radio Network Controller (RNC), an NodeB, an eNodeB, a wireless Access Point (AP), or any other appropriate RRM node in a wireless communications network, predicts future scheduling decisions for its cell. The RRM node will in the following be exemplified in the form of a radio base station. The prediction of the scheduling of resources in the form of resource blocks, each comprising a number of resource elements, is typically both for time and frequency domain. Hence, the predicted scheduling is performed by predicting which resource blocks will be allocated to one or more mobile terminal during a subsequent scheduling time interval. In an embodiment of the invention, the prediction includes which TTIs the cell will allocate for use in the future, and at which frequency bands for each TTI. In addition, a priority measure for traffic using a resource block at a given TTI and frequency can be a part of the prediction. Preferably, the scheduling decisions sent to the neighbouring cell(s) are performed for future instants in time occurring after a time period stipulated by the inter-cell delay has elapsed. For instance, if the inter-cell delay, i.e., the delay over the X2 interface, is 50 ms, a scheduling prediction occurring >50 ms after the time of transmission of the scheduling prediction from the base station of the first cell to the base station of the neighbouring second cell must be undertaken and sent to the neighbouring base station, as the prediction otherwise would be outdated. Thus, in this particular example, the scheduled allocation of a resource block to a UE should be predicted at least 50 ms in advance and information reflecting the predicted allocation is sent from the first cell to the neighbouring second cell, such that the base station of the second cell receives the predicted scheduling before it is outdated owing to the inter-cell delay.

Information utilized for performing the prediction could include a number of items such as scheduling algorithm, previous scheduling decisions, cell load, number of UEs, traffic characteristics of upper layers, etc. The predicted scheduling of resources is sent to neighbouring cells, and the neighbouring base station will try to avoid using the resource blocks (with given TTIs and frequency bands) predicted for scheduling by the RRM node of the first cell when performing scheduling in its own, second, cell. If it is not possible to use other resource blocks than those predicted, at least resource blocks predicted for high priority traffic are preferably avoided. Finally, once the base station of the first cell has made and sent its predicted scheduling decision, the base station may optionally try to follow its future predictions. In this way, predictions become even more accurate. With the proposed approach, inter-cell interference can be reduced even with a relatively slow inter-cell interface.

Embodiments of the present invention will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 shows, as previously discussed, the smallest air interface resource in an LTE communications system which is called a resource element and consists of one OFDM subcarrier over the duration of one OFDM symbol. A resource block consists of 12 OFDM subcarriers over a 0.5 ms slot. The allocation of a resource block is defined over TTIs of 1 ms and therefore the minimum scheduling unit is called a resource block pair which consists of two resource blocks. Any number of resource blocks, from 6 to 110, can be allocated to a UE. This represents a bandwidth between 1 and 20 MHz.

Figure 2:
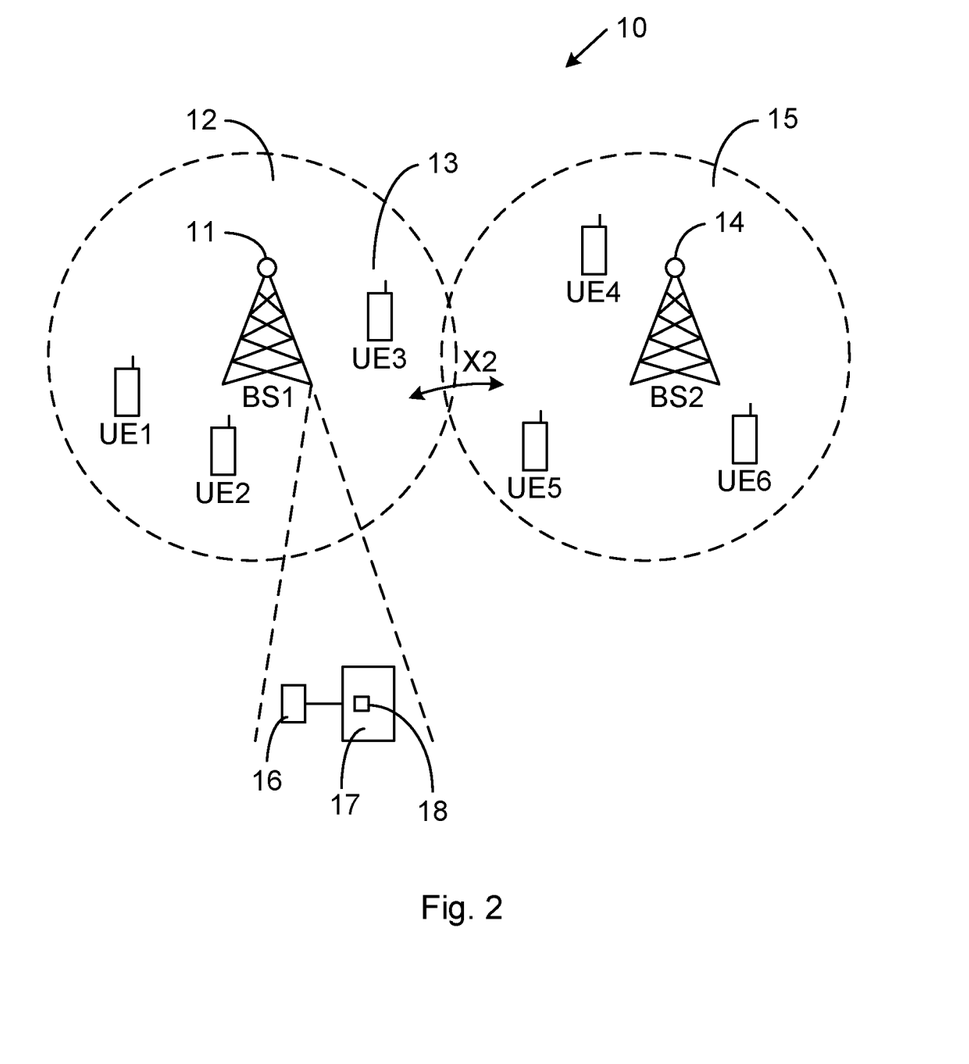
FIG. 2 illustrates a basic communication network in which the present application can be implemented.

FIG. 2 illustrates a basic communication network 10 in which embodiments of the invention can be implemented. It should be noted that FIG. 2 is an illustration only to describe a basic idea of the invention, and that a communication network in practice typically comprises many different network elements and nodes. In an embodiment of the invention, a base station 11 of a first cell 12 will predict allocation of air interface resources to at least one mobile terminal 13 in the first cell 12. In practice, the base station 11 of the first cell 12 will schedule a large number of mobile terminals. Thus, the base station 11 predicts allocation of one or more resource blocks in a subsequent scheduling time interval to the at least one mobile terminal 13 in the first cell 12. Thereafter, information pertaining to the predicted allocation, in the form of which resource blocks are predicted to be allocated, is sent by the base station 11 of the first cell 12 over the X2 communication interface to a base station 14 of a second neighbouring cell 15. The neighbouring base station 14 will schedule resources for at least one mobile terminal 16 (in practice a large number of UEs) of the neighbouring cell 15 taking into account the information received from the base station 11 of the first cell 12. Advantageously, inter-cell interference can be reduced since the base station 14 of the second cell 15 takes into account predicted resource allocations of the first cell 12 in that the second base station 14 will avoid resource blocks already predicted to be selected for mobile terminals UE1-UE3 of the first cell 12. Further advantageous is that the predicted allocation of resource blocks for the mobile terminals of the first cell 12 typically is performed by the first base station for an instant in time which lies beyond a time period determined by the delay over the X2 interface.

With further reference to FIG. 2, the methods of predicting the allocation of resource blocks according to embodiments of the present invention at the base stations 11, 14 is performed by a processing unit 16 embodied in the form of one or more microprocessors arranged to execute a computer program 18 downloaded to a suitable storage medium 17 associated with the microprocessor, such as a Random Access Memory (RAM), a Flash memory or a hard disk drive. Thus, as is illustrated by means of dashed lines in FIG. 2, the processing unit 16 and the storage medium 17 are included in the first base station 11. The processing unit 16 is arranged to carry out the method according to embodiments of the present invention when the appropriate computer program 18 comprising computer-executable instructions is downloaded to the storage medium 17 and executed by the processing unit 16. The storage medium 17 may also be a computer program product comprising the computer program 18. Alternatively, the computer program 18 may be transferred to the storage medium 17 by means of a suitable computer program product, such as a Digital Versatile Disc (DVD) or a memory stick. As a further alternative, the computer program 18 may be downloaded to the storage medium 17 over a network. The processing unit 16 may alternatively be embodied in the form of a digital signal processor (DSP), an application specific integrated circuit (ASIC), a field-programmable gate array (FPGA), a complex programmable logic device (CPLD), etc. Further, even though not shown in FIG. 2, the second base station 14 typically comprises a corresponding processing unit and memory unit comprising a computer program executable by the processing unit.

Figure 3A:
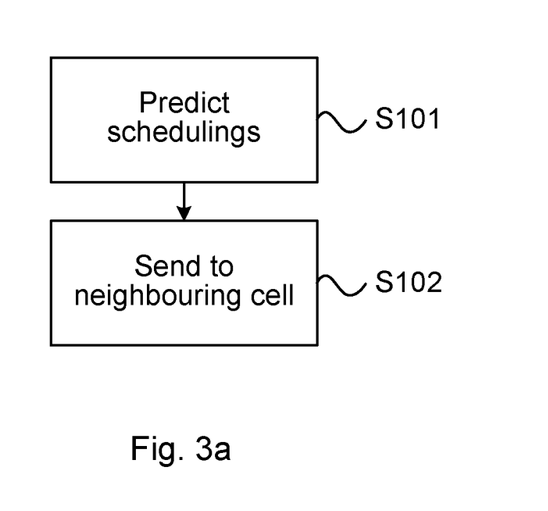
FIGS. 3a-b illustrate flow charts of embodiment of the methods according to the present invention.
Figure 3B:
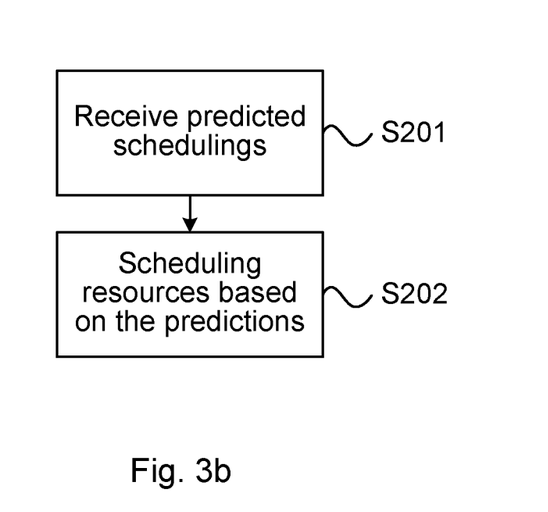

FIG. 3a illustrates a flow chart of a method undertaken at the first base station 11, while FIG. 3b illustrates a flow chart of a method undertaken at the second base station 14.

With reference to FIG. 3a, in a first step S101, the base station 11 of a first cell 12 will predict future resource allocations, i.e., the base station 11 will predict allocations of resource blocks for a subsequent scheduling time interval, of at least one mobile terminal 13 in the first cell 12. In practice, the base station 11 of the first cell 12 will schedule a large number of mobile terminals. Thereafter, in step S102 information pertaining to the predicted resource allocations is sent by the base station 11 of the first cell 12 over the X2 communication interface to the base station 14 of the second neighbouring cell 15. The scheduler of the base station 11 of the first cell 12 may or may not follow its own predicted resource allocations, depending on how well the predicted allocations comply with actual network conditions. For instance, assuming that the predictions are made 50 ms in advance, the scheduler of the base station 11 could after 50 ms determine that following the prediction would lead to poor performance because the network conditions have changed drastically.

With reference to FIG. 3b, in a first step S201, the base station 14 of the neighbouring second cell 15 receives the information pertaining to the predicted resource allocations from the first base station 11. The neighbouring base station 14 will subsequently in step S202 schedule resources for at least one mobile terminal 16 (in practice a large number of UEs) of the neighbouring cell 15 taking into account the predicted resource allocations received from the base station 11 of the first cell 12.

Figure 4:
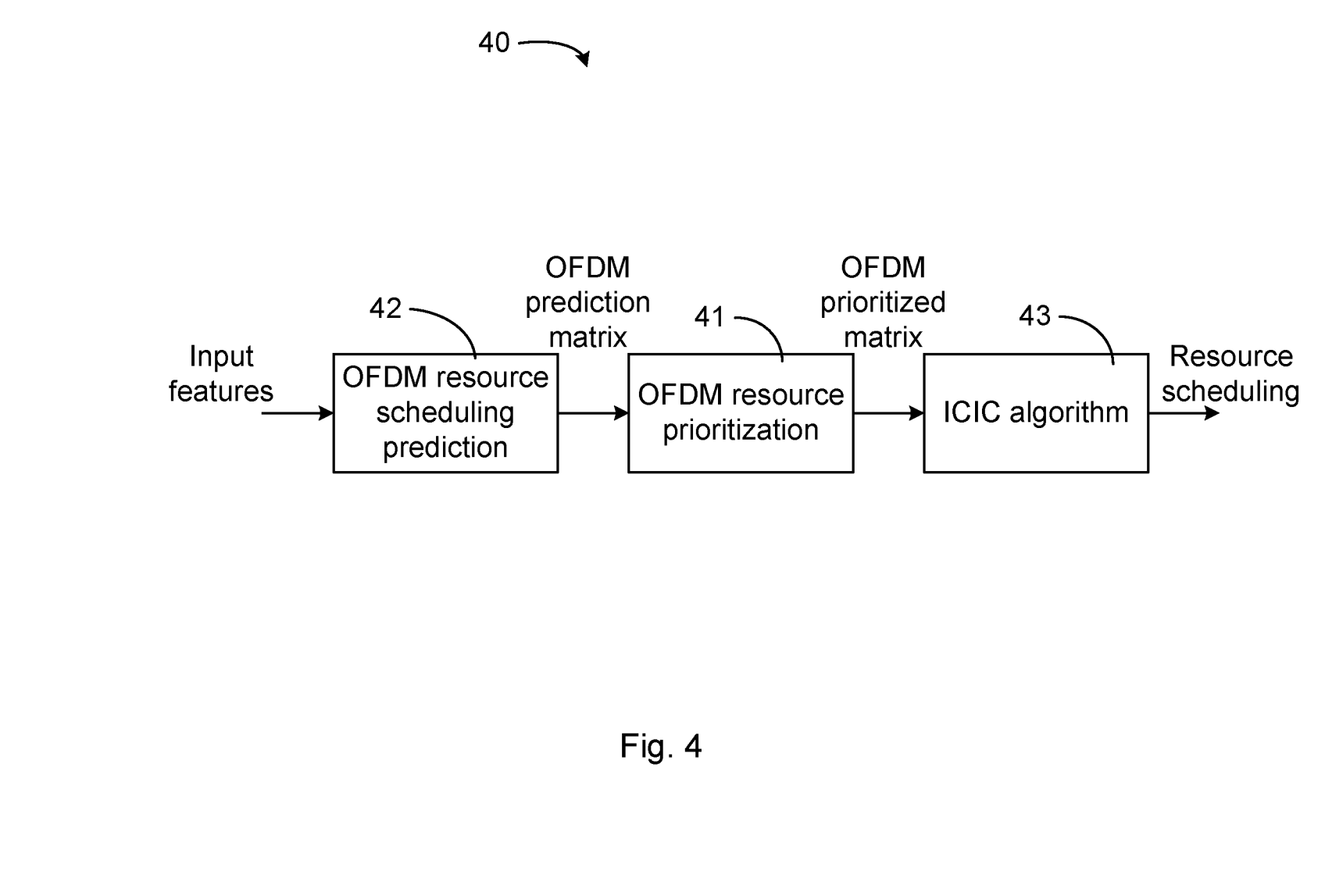
FIG. 4 shows a scheduling architecture according to an embodiment of the invention implemented at a base station.

FIG. 4 shows a scheduling architecture 40 according to an embodiment of the invention implemented at the first base station 11 (and conversely at the second base station 14 in case scheduling predictions are to be undertaken at the second base station), possibly in the scheduler of the base station. The scheduling architecture 40 comprises a scheduling prediction module 41 to predict the future scheduling of the cell. The scheduling prediction module 41 takes a variety of inputs and predicts the upcoming resource scheduling, resulting in an OFDM prediction matrix. A prioritization module 42 may assign a priority measure to each used resource block depending on traffic type, geometry statistics, UE signal-to-interference-plus-noise ratio (SINR), etc., resulting in an OFDM prioritized matrix. Finally, an ICIC algorithm module 43 uses the predicted matrix to compute a resource scheduling that avoids interference as much as possible.

In the following, the three different modules 41, 42, 43 of the scheduling architecture 40 will be discussed in detail.

Figure 5:
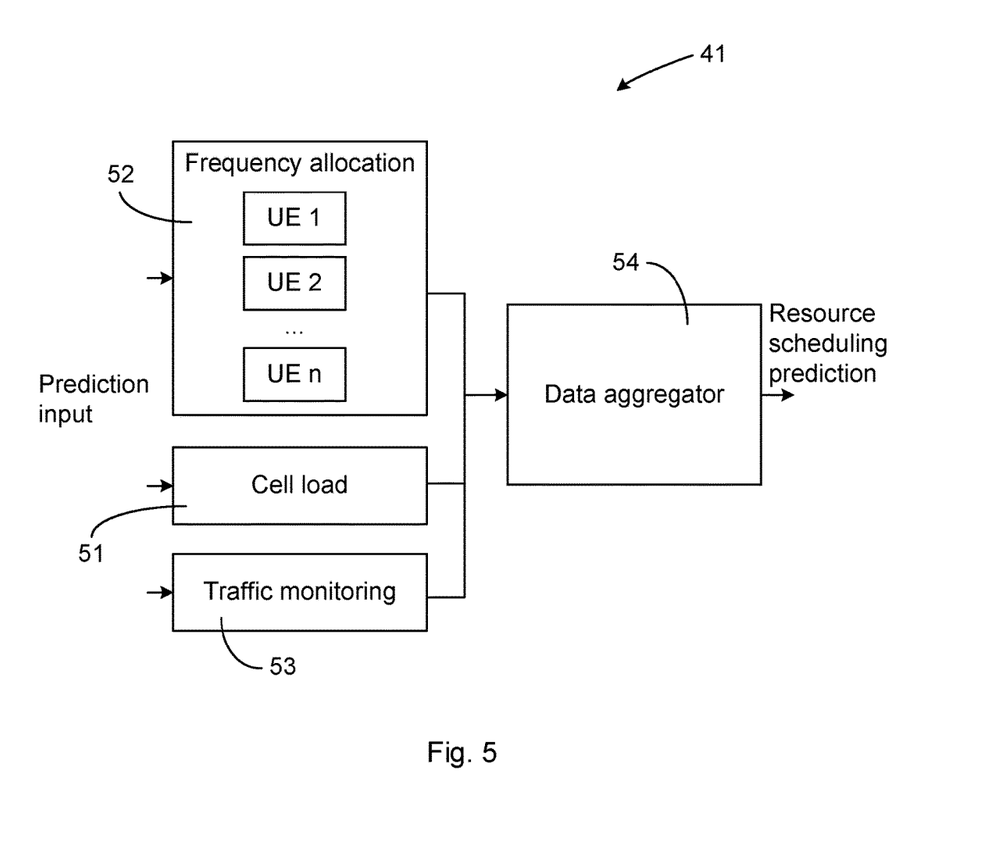
FIG. 5 shows a detailed view of a prediction module of FIG. 4.

With reference to FIG. 5, the prediction module 41 takes a list of inputs and predicts a scheduling output. Basically, there are at least two network parameters that need to be predicted. One parameter is the load at each TTI predicted by cell load module 51, which mainly depends on the traffic load from cell users. The second parameter is the scheduling frequencies that will be used by frequency allocation module 52, i.e., the frequencies of the radio channels established for the UEs in a cell. In addition, the scheduler may use different frequency allocation strategies when the channel quality does not differ significantly. Therefore, the information pertaining to the frequency allocation strategy from the scheduler can also be used in prediction. A traffic monitoring module 53 may further be included. This module monitors traffic and tries to identify patterns in the traffic, such as periodicity of traffic, amount of data, number of active UEs, cell load, etc.

The prediction module 41 may also need to combine prediction results from other prediction sub-modules. For example, a prediction sub-module for each user in the cell can be used which predicts the scheduling information of a particular UE. Thereafter, the base station combines UE level predictions to cell level prediction. Results from the prediction sub-modules need to be aggregated to a single scheduling prediction, which is undertaken by data aggregation module 54.

Figure 6:
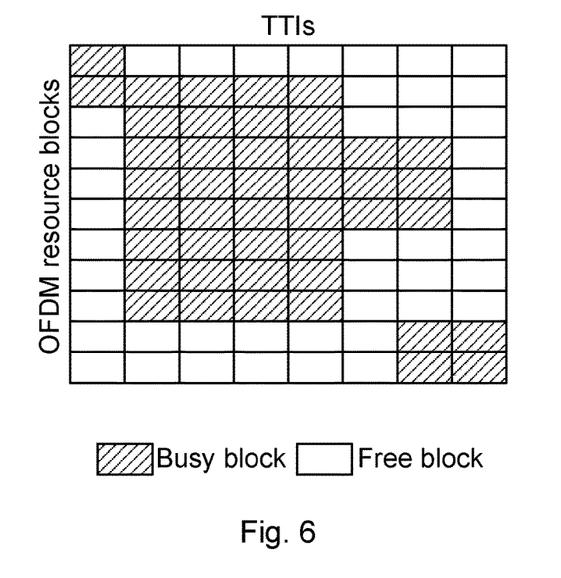
FIG. 6 illustrates an OFDM prediction matrix output from the prediction module of FIGS. 4 and 5.

FIG. 6 illustrates an OFDM prediction matrix output from the data aggregation module 54 of the prediction module 41 for a particular cell, where OFDM resource blocks are arranged in rows while TTIs are arranged in columns, in this particular example in an 11×8 matrix. In this particular example, allocated non-available blocks in the matrix are indicated with stripes. Thus, the base station 14 of the second cell 15 should in an embodiment of the present invention avoid the allocated non-available blocks when receiving information pertaining to the predicted resource allocations from the base station 11 of the first cell 12, and thus schedule mobile terminals UE4-UE6 using available resource blocks in the OFDM prediction matrix in order to avoid interference. In practice the output matrix of FIG. 6 could be binary, where a "1" indicates that a resource block is allocated and hence non-available at a specific TTI while a "0" indicates that a resource block is available to be used in the scheduling in the second cell. Alternatively, if the traffic is to be prioritized for the resource blocks, an integer value coding of the priority can be used.

Another parameter that could be used as an input to the prediction module 41 for prediction of radio channel variation is a so-called coherent time of each UE. This could be performed by utilizing Doppler shift estimation. By considering channel variation correlations, it is possible to predict channel quality in the frequency and time domain. The correlations can further be used to estimate velocity of a UE. The information can be used to decide what type of resource and scheduling strategy that should be used. For example, if the coherent time is corresponds to a UE moving slower than a certain lower speed threshold, such as 15 km/h, frequency selective scheduling can be used to obtain frequency selective gain. Otherwise, if the channel varies fast and the UE moves faster than an upper speed threshold, other schemes could be used, for example frequency hopping, to achieve diversity gain in the frequency domain.

Figure 7:
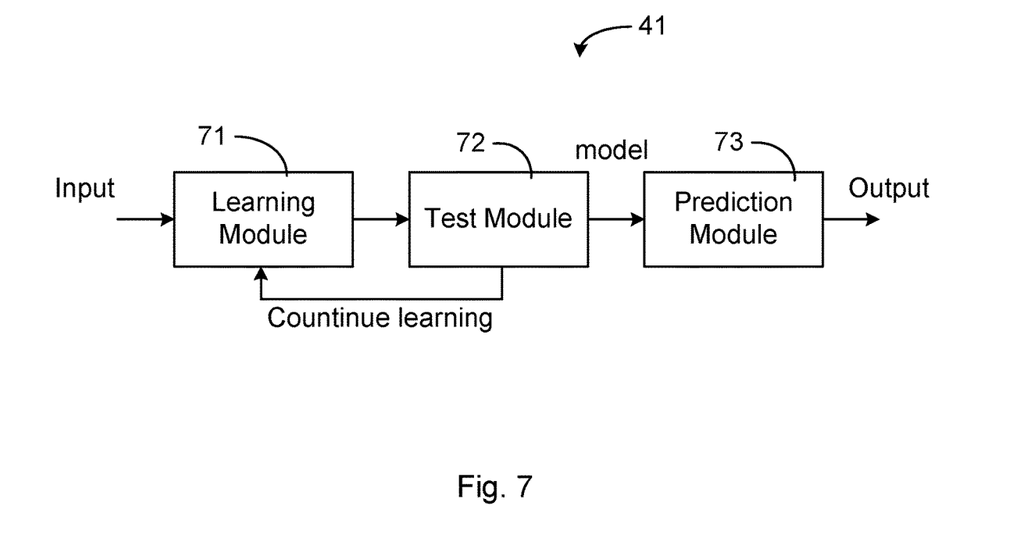
FIG. 7 illustrates a machine learning process.

FIG. 7 illustrates the prediction module 41 according to an embodiment of the present invention further being complemented with a learning module 71 and a test module 72. The learning module 71 develops a model that maps selected input parameters as previously discussed to an output. For example, with reference to FIG. 5, the cell load prediction module 51 takes past and current cell load and information from active UEs as input and maps it to a cell load prediction as output.

The learning phase is processed during a time period T1. After this time, the developed model resulting from the learning phase is provided to the test module 72. During the learning phase, no prediction is made. It may therefore be preferable that it is as short as possible. On the other hand, a longer learning time might result in a better model. The learning time can be controlled by the network operator to achieve a desirable tradeoff. This may be performed on a continuous basis in order to continuously improve the model over time as conditions may change.

The test module 72 has as a task to check if the prediction model from the learning module 71 complies with new data to continuously improve the learning process. During a time period T2, the scheduling architecture 40 (shown in FIG. 4) uses the model developed during the learning phase and compares the result of the prediction module 41 to the actual measured output provided by the ICIC algorithm module 43. If the generalization error is small enough then the prediction architecture 40 can provide the tested model to the prediction module 41. If not, the prediction architecture 40 can revert to the learning module 71 (also using the test data) to improve the prediction model output from the test module 72 to the prediction module 41.

A number of appropriate algorithms can be used to produce the prediction model supplied to the prediction module 41, such as linear regression, neural networks methodologies, Support Vector Machines (SVMs), random forests, etc.

Finally, in the prediction module 41, the prediction model developed in the learning module 71 and tested in the test module 72 is used in order to predict the output. This is the normal state for the prediction architecture 40. The prediction is undertaken at cell level, i.e., each cell develops its own model.

As previously has been discussed and as was described with reference to FIG. 1, the prediction of future resource allocations comprises, in an embodiment, prediction of the frequency subcarrier allocations for each UE in the cell. These predictions can then be aggregated to form the binary OFDM prediction matrix for the cell, as was illustrated in FIG. 6, where blank entries in the matrix indicates available resource blocks. The input to the prediction module 41 for producing the OFDM prediction matrix in the prediction architecture 40 may in embodiments of the present invention be any one or more of SINR,
Earlier resource block allocation,
Priority of resource blocks,
Cell load and number of active UEs,
Traffic patterns, and
Type of scheduler, UE capabilities, etc.

These input parameters will be discussed in more detail in the following.

In order to calculate the resource allocation, the scheduler can advantageously in an embodiment use channel quality of each subcarrier for each UE in order to allocate, to the UEs, subcarriers having a sufficiently high SINR. Therefore, the SINR of each UE on each subcarrier (or the average over 12 subcarriers) is an advantageous input parameter to the prediction module 41 for the prediction of future scheduling decisions. The format of the SINR input to the prediction architecture 40 may, e.g., be a matrix, the size of which equals the number of UEs to be scheduled times 12 subcarrier blocks. Each value in the matrix may be a SINR value in dB.

In another embodiment, an input parameter supplied to the prediction module 41 for the prediction of future scheduling decisions is earlier resource block allocation of the scheduler/prediction architecture 40. Thus, earlier resource block allocations are taken into account for a plurality of past TTIs when creating the OFDM prediction matrix output by the prediction module 41.

In a further embodiment of the present invention, the number of active UEs in the cell to be scheduled is an input parameter advantageously supplied to the prediction module 41 for the prediction of future scheduling decisions. If there are many UEs to be scheduled in the cell, the probability that a single UE receives the majority of the OFDM resource blocks is low, and vice versa. With a Round-Robin scheduler, each UE will generally be allocated a number of resource blocks proportional to the total number of resource blocks divided by the number of active UEs in the cell.

In yet a further embodiment of the present invention, the load of the cell to be scheduled is an input parameter advantageously supplied to the prediction module 41 for the prediction of future scheduling decisions. The cell load indicates amount of traffic in the cell and is a good indicator of how many resource blocks that may be scheduled. The higher the cell load, the higher the number of allocated OFDM resource blocks.

In still another embodiment of the present invention, priority of resource blocks is advantageously supplied to the prediction module 41 for the prediction of future scheduling decisions. Resource blocks may be assigned different priority based on the type of traffic that is using a particular resource block. A UE with a high priority will have a higher probability of being scheduled a number of TTIs in sequence of a given resource.

In a further embodiment of the present invention, UE capability is advantageously supplied to the prediction module 41 for the prediction of future scheduling decisions. The capability of UEs in the cell is a relevant parameter. For instance, some UEs cannot use certain parts of the bandwidth offered in a cell because of capability limitations, in which case appropriate subcarriers must be selected.

In still a further embodiment of the present invention, traffic patterns are advantageously supplied to the prediction module 41 for the prediction of future scheduling decisions. By using Deep Packet Inspection (DPI), it is possible to identify traffic patterns of individual UEs to take into account when performing the prediction.

Again with reference to FIG. 4, the prioritization module 42 receiving the OFDM prediction matrix from the prediction module 41 will be described in more detail according to an embodiment of the invention.

A task of the prioritization module 42 comprised in the prediction architecture 40 implemented in a scheduler of a base station is, for the cell in which it is operating, to set a priority for each resource block which is predicted to be used in a future scheduling. These priorities will be used by the ICIC algorithm 43 to allocate a resource block in case of conflicts between two cells. The priority can be selected by the network operator, e.g., based on any one or more of the following parameters:

Cell geometry statistics,
UE SINR, and
Traffic type, etc.

Hence, a UE fulfilling for instance an appropriately set criterion associated with any of these parameters could be given priority to selected resource blocks.

Figure 8:
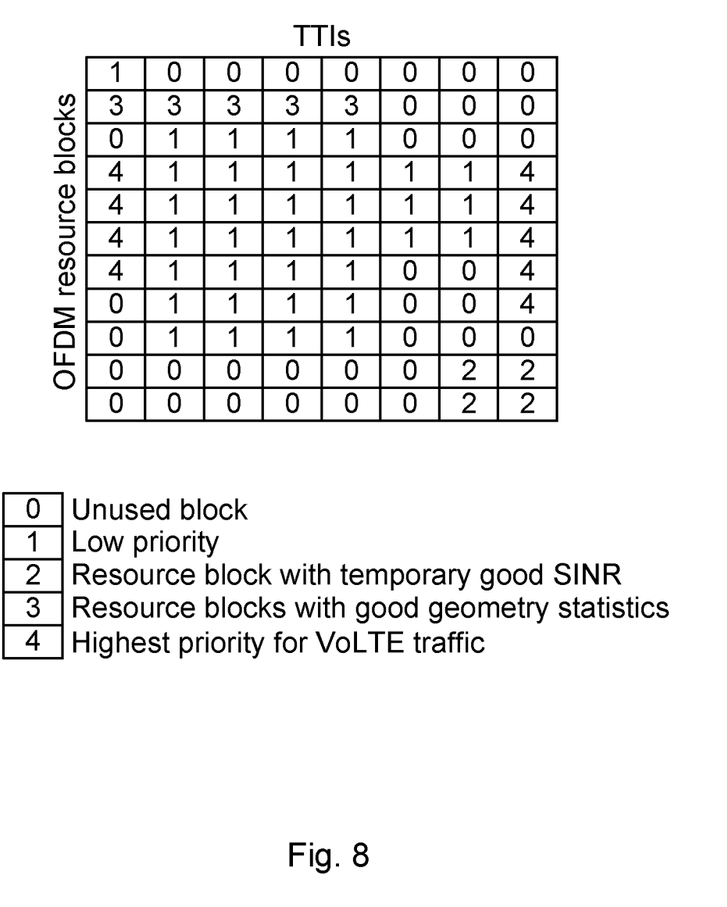
FIG. 8 illustrates an OFDM prioritization matrix output from a prioritization module of FIG. 4.

The output of the prioritization module 42 is an OFDM prioritization matrix for instance having the structure shown in FIG. 8. Thus, it has the same size as the OFDM prediction matrix shown in FIG. 6, but contains an integer value for each resource block and TTI instead of only information whether a resource block is available for allocation or not. A priority of "0" implies that a resource block is available and a rising number implies a higher priority. As an example:

"1"—low priority,
"2"—resource block with currently high SINR,
"3"—resource block with currently good cell geometry statistics, and
"4"—Highest-priority Voice over LTE (VoLTE) traffic.

With reference again to FIG. 4, the ICIC algorithm module 43 receiving the OFDM prioritization matrix from the prioritization module 42 will be described in more detail according to an embodiment of the present invention.

A task of the ICIC algorithm module 43 is to provide a predicted resource scheduling that limits inter-cell interference between the first cell 12 and the second cell 15. Each cell 12, 15 will predict its own future resource allocation and then supply information pertaining to the predicted resource allocation to its neighbouring cells (only two cells are shown in FIG. 2 for illustrational purposes). Then at each TTI, the base station 11, 14 of each cell 12, 15 is using the most up-to-date prediction of the other cells and its own scheduling decisions to allocate its resource blocks to the mobile terminal in the cell. There are two main issues to be considered in this context:

The scheduler of a base station in a cell will calculate the "optimal" resource scheduling. Such an optimal scheduling is not necessarily the same as the predicted scheduling it did several TTIs ago (e.g., corresponding to an X2 delay of 50 ms, i.e., 50 TTIs earlier), which predicted scheduling the base station sent to the other cells in order to enable ICIC. The base station has two choices: either follow its present optimal scheduling strategy or to align to its earlier predicted scheduling. The more the base station complies with the present strategy, the more efficient the resource utilization but also the more interference it will experience from other neighbouring cells.

Similarly, the scheduler of the base station will have to align on the predictions it receives from other neighbouring cells. In this case, the closer it complies with the present optimal strategy, the more efficient the resource utilization but also the more interference it will cause to the other cells.

Therefore, in an embodiment of the present invention, the ICIC algorithm module 43 is configured to take into account these trade-offs. Two decision trade-off parameters, $t_{in}$ and $t_{out}$, are defined to attain a value between 0 and 1. These values may be configured by the network operator. The value of $t_{in}$ represents an incentive of a base station to follow its own prediction. If it is 0, the cell will strictly follow its own present scheduling without trying to align to its earlier predicted scheduling. On the other hand, if it is 1, the cell uses the previous predicted resource scheduling as new current resource scheduling. If $t_{in}$ is between 0 and 1, for example 0.6, then the base station will allocate 60% of the resource blocks, typically the ones with highest priority and respect its own predicted scheduling for these resource blocks which account for 60% of the total number of resource blocks. The other blocks can be chosen freely. The variable $t_{out}$ is used similarly. A value of 0 means that the base station will not consider the interference it causes the other neighbouring cells, but align with its present optimal scheduling, while a value of 1 means that the cell will try to avoid most interference at the cost of its own rate and fully comply with its previous predicted scheduling.

Figure 9:
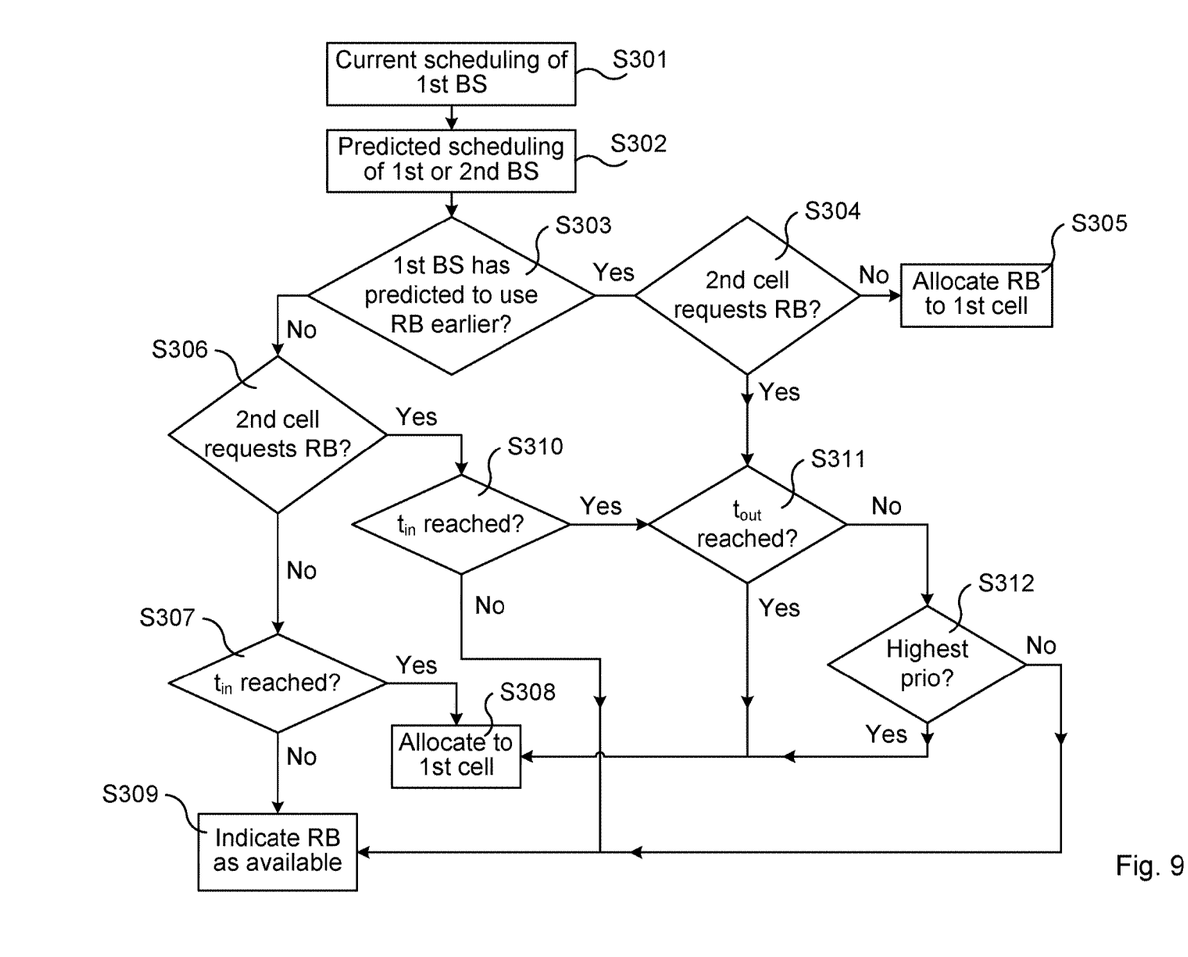
FIG. 9 illustrates a flowchart of an ICIC algorithm according to an embodiment of the present invention.

FIG. 9 illustrates a flowchart of the ICIC algorithm performed in module 43 of the prediction architecture 40 according to an embodiment of the present invention. In a first step S301, the scheduler of the first base station 11 determines a current desired resource scheduling according to a given criterion. The current instant in time is denoted t. Further, in step S302, the scheduler of the first base station 11 takes into account its previously predicted allocation of resource blocks for time t as well as the predicted allocation of resource blocks of the second base station 14 of the neighbouring cell 15 for the same time t.

From these three scheduling strategies, i.e., (a) the current desired scheduling and (b) the previously predicted scheduling undertaken for the current instant in time of the first cell 12, as well as (c) the previously predicted scheduling for the current instant in time of the second cell 15, the scheduler of the first base station 11 determines in step S303 how the resource block for time t should be scheduled. A number of options are possible, as will be discussed in the following, when a scheduler of the first base station 11 wishes to schedule a particular resource block at time t.

Thus, if in step S303, the scheduler of the first base station 11 previously has predicted to use a particular resource block at time t in the first cell 12, and it is determined in step S304 that the second base station 14 of the neighbouring cell 15 does not want to use it, then the resource block is allocated to the first cell 11 in step S305, since there is no conflict.

If in step S303, the scheduler of the first base station 11 previously has not predicted to use the particular resource block at time t in the first cell 12, and it is determined in step S306 that the second base station 14 of the neighbouring cell 15 does not want to use it in the second cell 15, then the scheduler of the first base station 11 will consider the first trade-off parameter $t_{in}$ in step S307. If the predetermined parameter $t_{in}$, which stipulates to which degree the first base station 11 should comply with its earlier predicted scheduling, already is complied with, i.e., whether a limit stipulated by $t_{in}$ is reached, then the first base station 11 can allocate the resource block freely (since the second cell 15 does not allocate it) and the resource block is thus allocated to the first cell 12 in step S308. If not, the first base station will allocate the resource block according to its earlier prediction in step S309, which in this particular case means that the first base station 11 will indicate the resource block to be available. Hence, in line with the previous example, if $t_{in}$=0.6 and hence 60% of the resource blocks have not yet been allocated in accordance with the earlier prediction, $t_{in}$ has not been reached and the resource block is allocated according to the earlier prediction (i.e., it is indicated as being available). Otherwise, the first base station 11 allocates the resource block freely, in this case to the first cell 12.

To the contrary, if in step S306 it is determined that the second neighbouring cell 15 indeed wants to use the particular resource block at time t, the scheduler of the first base station 11 will consider the first trade-off parameter $t_{in}$ in step S310. If the limit stipulated by $t_{in}$ is not reached, the first base station 11 will allocate the resource block according to its earlier prediction in step S309, which in this particular case means that the first base station 11 will indicate the resource block to be available. If $t_{in}$ on the other hand is reached in step S310, the scheduler of the first base station 11 proceeds to step S311, where it is determined whether a limit stipulated by the second trade-off parameter $t_{out}$ is reached, which defines to which degree the first cell 12 is allowed to cause interference to the neighbouring second cell 15, has been reached. For instance, a value of $t_{out}$=0.7 would indicate that 70% of the resource blocks should be allocated such that interference in the second cell 15 is avoided. Hence, if $t_{out}$ is reached, the remaining resource blocks can be allocated regardless of whether they cause interference or not, in which case the resource block is allocated to the first cell 12 in step S308. If on the other hand $t_{out}$ is not reached in step S311, the scheduler of the first base station 11 should try to avoid causing interference to the second cell 15, in which case it determines in step S312 whether the resource block is a high priority block. If that is the case, the resource block is allocated to the first cell 12 in step S308. If not, the resource block is indicated as available in step 309.

Going back to step S303, if the scheduler of the first base station 11 previously has predicted to use a particular resource block at time t, and it is determined in step S304 that the neighbouring second cell 15 wants to use it, then the flowchart proceeds to step S311, as just described.

It should be noted that for resource blocks that have been indicated as available by the scheduler of the first base station 11, a variable $r_{av}$, e.g., set by the network operator, may stipulate the ratio of available resource blocks that can be allocated to the first cell 12. After the process of the ICIC algorithm illustrated in the flowchart of FIG. 9 has been performed, the algorithm should iterate from the beginning if it has not achieved its target in terms of required rate for certain UEs or applications. As is illustrated in Step S312, high priority traffic may be scheduled no matter the scheduling of the neighbouring second cell.

Figure 10:
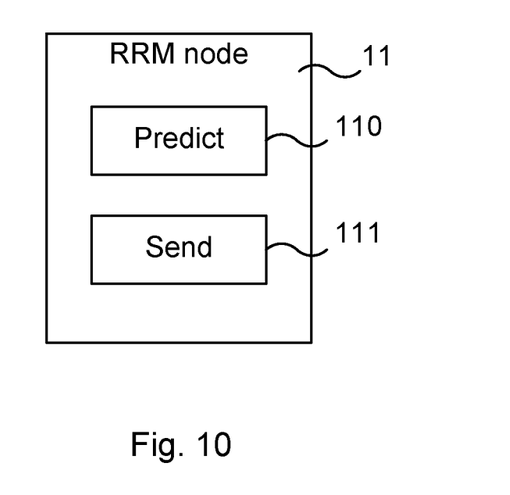
FIG. 10 illustrates an RRM node according to an embodiment of the present invention.

FIG. 10 shows an RRM node 11 of a first cell according to an embodiment of the present invention. The RRM node 11 comprises predicting means 111 adapted to predict allocation of one or more resource blocks in a subsequent scheduling time interval to at least one mobile terminal in the first cell, and sending means 112 adapted to send information pertaining to the predicted allocation to an RRM node of a neighbouring second cell. The predicting means 111 and/or the sending means 112 may comprise a communications interface for receiving and providing information to other devices. The predicting means 111 may further comprise a local storage for storing obtained and/or processed data. The predicting means 111 and sending means 112, may (in analogy with the description given in connection to FIG. 2) be implemented by a processor embodied in the form of one or more microprocessors arranged to execute a computer program downloaded to a suitable storage medium associated with the microprocessor, such as a RAM, a Flash memory or a hard disk drive. The predicting means 111 and sending means 112 may comprise one or more transmitters and/or receivers and/or transceivers, comprising analogue and digital components and a suitable number of antennae for radio communication.

Figure 11:
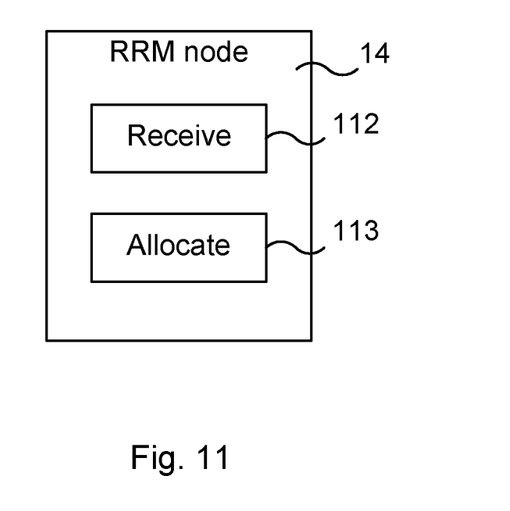
FIG. 11 illustrates an RRM node according to a further embodiment of the present invention.

FIG. 11 shows an RRM node 14 of a second cell according to an embodiment of the present invention. The RRM node 14 comprises receiving means 113 adapted to receive, from an RRM node of a neighbouring first cell, information pertaining to predicted allocation of one or more resource blocks in a subsequent scheduling time interval to at least one mobile terminal in the neighbouring first cell, and allocating means 114 adapted to allocate one or more resource blocks in the subsequent scheduling time interval to at least one mobile terminal of the second cell at least in part based on the received information. The receiving means 113 and/or the allocating means 114 may comprise a communications interface for receiving and providing information to other devices. The allocating means 114 may further comprise a local storage for storing obtained and/or processed data. The receiving means 113 and allocating means 114, may (in analogy with the description given in connection to FIG. 2) be implemented by a processor embodied in the form of one or more microprocessors arranged to execute a computer program downloaded to a suitable storage medium associated with the microprocessor, such as a RAM, a Flash memory or a hard disk drive. The receiving means 113 and allocating means 114 may comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a Radio Resource Management (RRM) node in a first cell of facilitating scheduling of resource blocks for at least one mobile terminal in a neighboring second cell of a wireless communications network, the method comprising:
predicting allocation of one or more resource blocks in a subsequent scheduling time interval to at least one mobile terminal in the first cell;
sending information pertaining to the predicted allocation to an RRM node of the neighboring second cell; and
wherein a start of the subsequent scheduling time interval, in which the allocations are predicted, is selected to occur after an expected instant in time at which the RRM node of the neighboring second cell receives the information pertaining to the predicted allocation of the one or more resource blocks to at least one mobile terminal in the first cell, which information is sent from the RRM node of the first cell.

2. The method according to claim 1, further comprising:
allocating one or more resource blocks in the subsequent scheduling time interval to the at least one mobile terminal in the first cell at least in part based on the predicted allocation for the at least one mobile terminal in the first cell.

3. The method according to claim 1, further comprising:
receiving information pertaining to predicted allocation, in the subsequent scheduling time interval, of one or more resource blocks to at least one mobile terminal in the neighboring second cell; and
allocating one or more resource blocks in the subsequent scheduling time interval to the at least one mobile terminal in the first cell at least in part based on the information pertaining to predicted allocation for the at least one mobile terminal in the neighboring second cell.

4. The method according to claim 1, wherein the information pertaining to the predicted allocation of the one or more resource blocks indicates a priority measure assigned to each of the one or more resource blocks.

5. The method according to claim 1, further comprising:
determining a desired current allocation of resource blocks for the first cell; and
considering the predicted allocated one or more resource blocks to the at least one mobile terminal in the first cell for a current instant of time and received information pertaining to predicted allocation of one or more resource blocks to at least one mobile terminal in the neighboring second cell for the current instant of time, to determine whether a current resource block should be allocated as desired.

6. The method according to claim 5, wherein the determining of how a current resource block should be allocated further comprises:
determining, from a first parameter, whether the first cell should comply with its predicted allocation.

7. The method according to claim 5, wherein the determining of how a current resource block should be allocated further comprises:
determining, from a second parameter, to which degree the first cell should avoid causing interference to the neighboring second cell.

8. The method according to claim 5, further comprising:
determining whether the current resource block previously was predicted to be allocated in the first cell.

9. The method according to claim 8, further comprising, if it is determined that the current resource block previously was predicted to be allocated in the first cell:
acquiring information pertaining to whether the RRM node of the neighboring second cell requests to allocate the current resource block in the second cell; and if not allocating the current resource block to the first cell.

10. The method according to claim 9, further comprising, if it is determined that the RRM node of the neighboring second cell does request to schedule the current resource block in the second cell:
determining, from a second parameter, whether a degree to which the first cell should avoid causing interference to the neighboring second cell is reached; and if so allocating the current resource block to the first cell.

11. The method according to claim 10, further comprising, if it is determined, from the second parameter, that the degree to which the first cell should avoid causing interference to the neighboring second cell not has not been reached:
determining whether the current resource block has a high priority; and if so allocating the current resource block to the first cell; otherwise indicating the current resource block as available.

12. The method according to claim 8, further comprising, if it is determined that the current resource block previously was not predicted to be allocated in the first cell:
determining whether the RRM node of the neighboring second cell requests to schedule the current resource block in the second cell.

13. The method according to claim 12, further comprising, if it is determined that the RRM node of the neighboring second cell does not request to schedule the current resource block in the second cell:
determining, from a first parameter, whether the first cell should comply with its predicted scheduling; and if not allocating the current resource block to the first cell; otherwise indicating the current resource block as available.

14. The method according to claim 13, further comprising, if it is determined that the RRM node of the neighboring second cell requests to schedule the current resource block in the second cell:
determining, from the first parameter, whether the first cell should comply with its predicted scheduling; and if so indicating the current resource block as available.

15. The method according to claim 14, further comprising, if it is determined, from the first parameter, that the first cell should not comply with its predicted scheduling:
determining, from a second parameter, whether the first cell is allowed to cause interference to the neighboring second cell; and if so allocating the current resource block to the first cell.

16. A non-transitory computer-readable storage medium storing a computer program comprising computer-executable instructions, which when executed on a processing circuit of a Radio Resource Management (RRM) node in a first cell configured to facilitate scheduling of resource blocks for at least one mobile terminal in a neighboring second cell of a wireless communications network, causes the RRM to:

predict allocation of one or more resource blocks in a subsequent scheduling time interval to at least one mobile terminal in the first cell;

send information pertaining to the predicted allocation to an RRM node of the neighboring second cell; and wherein a start of the subsequent scheduling time interval, in which the allocations are predicted, is selected to occur after an expected instant in time at which the RRM node of the neighboring second cell receives the information pertaining to the predicted allocation of the one or more resource blocks to at least one mobile terminal in the first cell, which information is sent from the RRM node of the first cell.

17. A Radio Resource Management (RRM) node in a first cell configured to facilitate scheduling of resource blocks for at least one mobile terminal in a neighboring second cell of a wireless communications network, said RRM node comprising a processing circuit and a memory, said memory containing instructions executable by said processing circuit, whereby said processing circuit is configured to:

predict allocation of one or more resource blocks in a subsequent scheduling time interval to at least one mobile terminal in the first cell;

send information pertaining to the predicted allocation to an RRM node of the neighboring second cell; and wherein a start of the subsequent scheduling time interval, in which the allocations are predicted, is selected to occur after an expected instant in time at which the RRM node of the neighboring second cell receives the information pertaining to the predicted allocation of the one or more resource blocks to at least one mobile terminal in the first cell, which information is sent from the RRM node of the first cell.

18. The RRM node according to claim 17, wherein the processing circuit is configured to:

allocate one or more resource blocks in the subsequent scheduling time interval to the at least one mobile terminal in the first cell at least in part based on the predicted allocation for the at least one mobile terminal in the first cell.

19. The RRM node according to claim 17, wherein the processing circuit is configured to:

receive information pertaining to predicted allocation, in the subsequent scheduling time interval, of one or more resource blocks to at least one mobile terminal in the neighboring second cell; and allocate one or more resource blocks in the subsequent scheduling time interval to the at least one mobile terminal in the first cell at least in part based on the information pertaining to the predicted allocation for the at least one mobile terminal in the neighboring second cell.

20. The RRM node according to claim 17, wherein the information pertaining to the predicted allocation of the one or more resource blocks indicates a priority measure assigned to each of the one or more resource blocks.

21. The RRM node according to claim 17, wherein the processing circuit is configured to:

determine a desired current allocation of resource blocks for the first cell; and consider the predicted allocated one or more resource blocks to the at least one mobile terminal in the first cell for a current instant of time and received information pertaining to predicted allocation of one or more resource blocks to at least one mobile terminal in the neighboring second cell for the current instant of time, to determine whether a current resource block should be allocated as desired.

22. The RRM node according to claim 21, wherein the processing circuit is configured to, when determining how a current resource block should be allocated:

determine, from a first parameter, whether the first cell should comply with its predicted allocation.

23. The RRM node according to claim 21, wherein the processing circuit is configured to, when determining how a current resource block should be allocated:

determine, from a second parameter, to which degree the first cell should avoid causing interference to the neighboring second cell.

24. The RRM node according to claim 21, wherein the processing circuit is configured to:

determine whether the current resource block previously was predicted to be allocated in the first cell.

25. The RRM node according to claim 24, wherein the processing circuit is configured to, if it is determined that the current resource block previously was predicted to be allocated in the first cell:

acquire information pertaining to whether the RRM node of the neighboring second cell requests to allocate the current resource block in the second cell; and if not allocate the current resource block to the first cell.

26. The RRM node according to claim 25, wherein the processing circuit is configured to, if it is determined that the RRM node of the neighboring second cell does request to schedule the current resource block in the second cell:

determine, from a second parameter, whether a degree to which the first cell should avoid causing interference to the neighboring second cell is reached; and if so allocate the current resource block to the first cell.

27. The RRM node according to claim 26, wherein the processing circuit is configured to, if it is determined, from the second parameter, that the degree to which the first cell should avoid causing interference to the neighboring second cell has not been reached:

determine whether the current resource block has a high priority; and if so allocate the current resource block to the first cell; otherwise indicate the current resource block as available.

28. The RRM node according to claim 24, wherein the processing circuit is configured to, if it is determined that the current resource block previously was not predicted to be allocated in the first cell:

determine whether the RRM node of the neighboring second cell requests to schedule the current resource block in the second cell.

29. The RRM node according to claim 28, wherein the processing circuit is configured to, if it is determined that the RRM node of the neighboring second cell does not request to schedule the current resource block in the second cell:

determine, from a first parameter, whether the first cell should comply with its predicted scheduling; and if not allocate the current resource block to the first cell; otherwise indicate the current resource block as available.

30. The RRM node according to claim 29, wherein the processing circuit is configured to, if it is determined that the RRM node of the neighboring second cell requests to schedule the current resource block in the second cell:

determine, from the first parameter, whether the first cell should comply with its predicted scheduling; and if so indicate the current resource block as available.

31. The RRM node according to claim 30, wherein the processing circuit is configured to, if it is determined, from the first parameter, that the first cell should not comply with its predicted scheduling:
- determine, from a second parameter, whether the first cell is allowed to cause interference to the neighboring second cell; and if so allocate the current resource block to the first cell.

* * * * *